United States Patent [19]

Schumacher

[11] Patent Number: 4,892,045
[45] Date of Patent: Jan. 9, 1990

[54] CONDENSATE DRAIN SYSTEM
[75] Inventor: David B. Schumacher, St. Louis, Mo.
[73] Assignee: Snyder General Corporation, Red Bud, Ill.
[21] Appl. No.: 247,633
[22] Filed: Sep. 22, 1988
[51] Int. Cl.4 ............................................. F23J 15/00
[52] U.S. Cl. ........................................ 110/203; 237/55; 122/20 B
[58] Field of Search ............... 237/55, 2 B; 122/20 B; 110/203

[56] References Cited
U.S. PATENT DOCUMENTS
4,523,438 6/1985 Curti ................................. 237/2 B
4,706,884 11/1987 Brauer ............................... 237/55

Primary Examiner—Henry A. Bennet
Assistant Examiner—John Sollecito
Attorney, Agent, or Firm—Rogers, Howell & Haferkamp

[57] ABSTRACT

A condensate drain system for a furnace incorporates a collector and blower housing assembly mounted above a secondary condensing heat exchanger with condensate ports between the blower housing and the collector housing positioned to assure flow of all condensate from the exhaust flue and the blower housing to the collector housing. A pipe extends downwardly from the collector housing to the condenser outlet manifold so that all condensate ultimately flows to the condenser outlet manifold and can be discharged to a drain by a single tube.

19 Claims, 2 Drawing Sheets

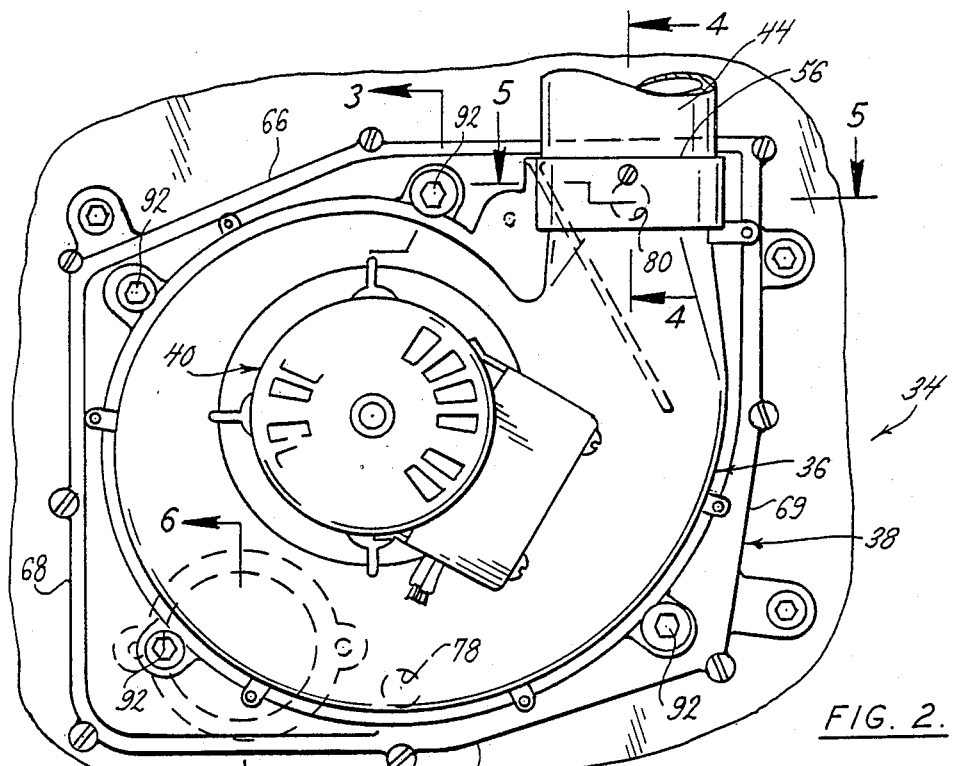
FIG. 2.
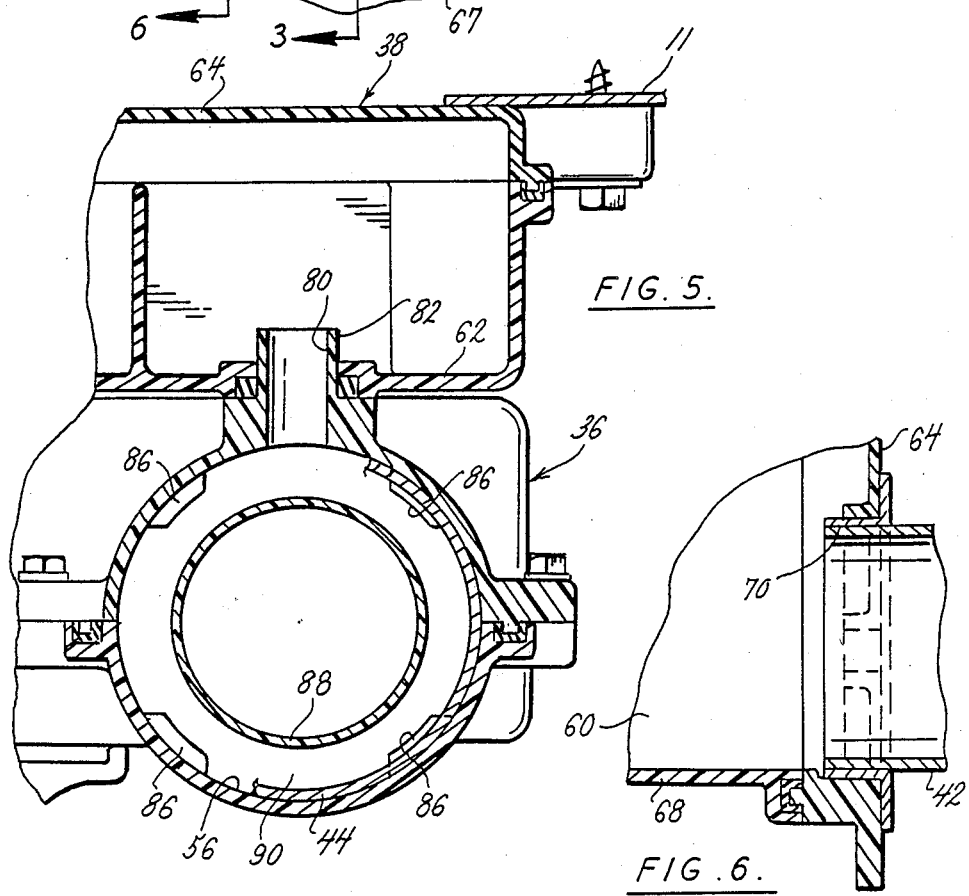
FIG. 5.
FIG. 6.

CONDENSATE DRAIN SYSTEM

BACKGROUND OF THE INVENTION

This invention relates to a condensate drain system for installation in a furnace. More particularly, the invention relates to a condensate drain system that has a dual blower and condensate collection housing installed to provide a single drain system to accomplish what heretofore has required, typically, three drains.

A high efficiency furnace incorporates a primary heat exchanger and a secondary heat exchanger. Products of combustion from a burner are caused by a blower to flow serially through the primary heat exchanger and the secondary heat exchanger. If the blower is an induction blower, the products of combustion flow from the secondary heat exchanger to a collector box and from there through the blower to an exhaust flue.

Although the products of combustion remain essentially in a gaseous state all the way through the primary heat exchanger, the purpose of the secondary heat exchanger is to act as a condenser to condense water from the combustion products. Therefore, exiting from the secondary heat exchanger into an outlet manifold are combustion products in a gaseous state mixed with water. Some of the water falls from the combustion gas to the bottom of the outlet manifold, while some of the water remains entrained in the combustion gas that flows to the collector box. While the combustion gas is in the collector box before being drawn into the blower, an additional amount of condensation falls from the air to the bottom of the collector box, but some condensation remains entrained in the combustion gas that flows through the blower and on to the exhaust flue. In the exhaust flue, more of the condensate falls from the combustion gas toward the lower end of the flue.

It is necessary that all this condensate be collected and discharged from the furnace. To handle the various collections of condensate in the condenser outlet manifold, the blower, and the exhaust flue, it has been customary to connect condensate tubing to each piece of equipment that collects the condensate. Typically, a tube is connected to the bottom of the outlet manifold from the condenser, another tube is connected from the bottom of the collector box, and still another tube is connected from the lower end of the exhaust flue. These tubes are individually fed to a suitable drain, such as a floor drain, or sometimes are connected to a common condensate trap which is then connected by another tube to the floor drain. Either arrangement results in three tubes from three sources of condensate and with their respective connections. These tubes are unsightly and often obstruct access to other furnace components. Also, there is danger in their coming disconnected and dripping condensate onto electrical contacts. Further, the multiplicity of tubes compounds leakage possibilities which can lead to rusting of components and the multiplicity of tubes adds to the cost of the furnace. Pursuant to the present invention, this multiplicity of tubes is replaced by a drain system that requires only a single tube.

SUMMARY OF THE INVENTION

This condensate drain system incorporates a collector housing joined to a blower housing by a common side wall. A blower clears combustion products from the collector housing to the blower housing through a port in the center of the common wall. An outlet port from the top of the blower housing is connected to an exhaust flue. A connecting pipe leading from the condenser outlet manifold of a secondary heat exchanger is connected to a port in the collector housing. The port is as low as the lowermost wall of the collector housing, and the connecting pipe has a downward orientation from the collector housing to the evaporator outlet manifold so that any condensate in the collector housing will flow down the connecting pipe and return to the outlet manifold. There are upper and lower condensate ports through the common wall between the collector and blower housings. The lower condensate port is at least as low as the lowest wall of the blower housing. There is a baffle below the exhaust flue outlet for intercepting condensate dripping from the exhaust flue and directing that condensate through the upper condensate port into the collector housing. The lower condensate port allows condensate collected in the blower housing together with any condensate that misses the baffle to flow from the blower housing into the collector housing. All of this condensate flows from collector housing back to the outlet manifold by way of the connecting pipe.

Since the collector and blower housing assembly is installed above the condenser outlet manifold, condensate from the collector housing, whether introduced through the upper condensate port or the lower condensate port, flows through the connecting pipe back to the condenser outlet manifold. A condensate port opens through the lowest wall of the condenser outlet manifold, and a condensate tube leads from that condensate port to a suitable drain. Because all condensate ultimately collects in the condenser outlet manifold, only this single tube is required.

DETAILED DESCRIPTION OF THE DRAWINGS

FIG. 2 is an enlarged side elevation view of the collector and burner housing assembly as viewed along the plane of the line 2—2 of FIG. 1;

FIG. 3 is an enlarged view in section taken along the plane of the line 3—3 of FIG. 2;

FIG. 4 is an enlarged view in section taken along the plane the line 4—4 of FIG. 2;

FIG. 5 is an enlarged view in section taken along the plane of the line 5—5 of FIG. 2; and FIG. 6 is an enlarged view in section taken along the plane of the line 6—6 of FIG. 2.

DETAILED DESCRIPTION OF PREFERRED EMBODIMENT

Figure 1:
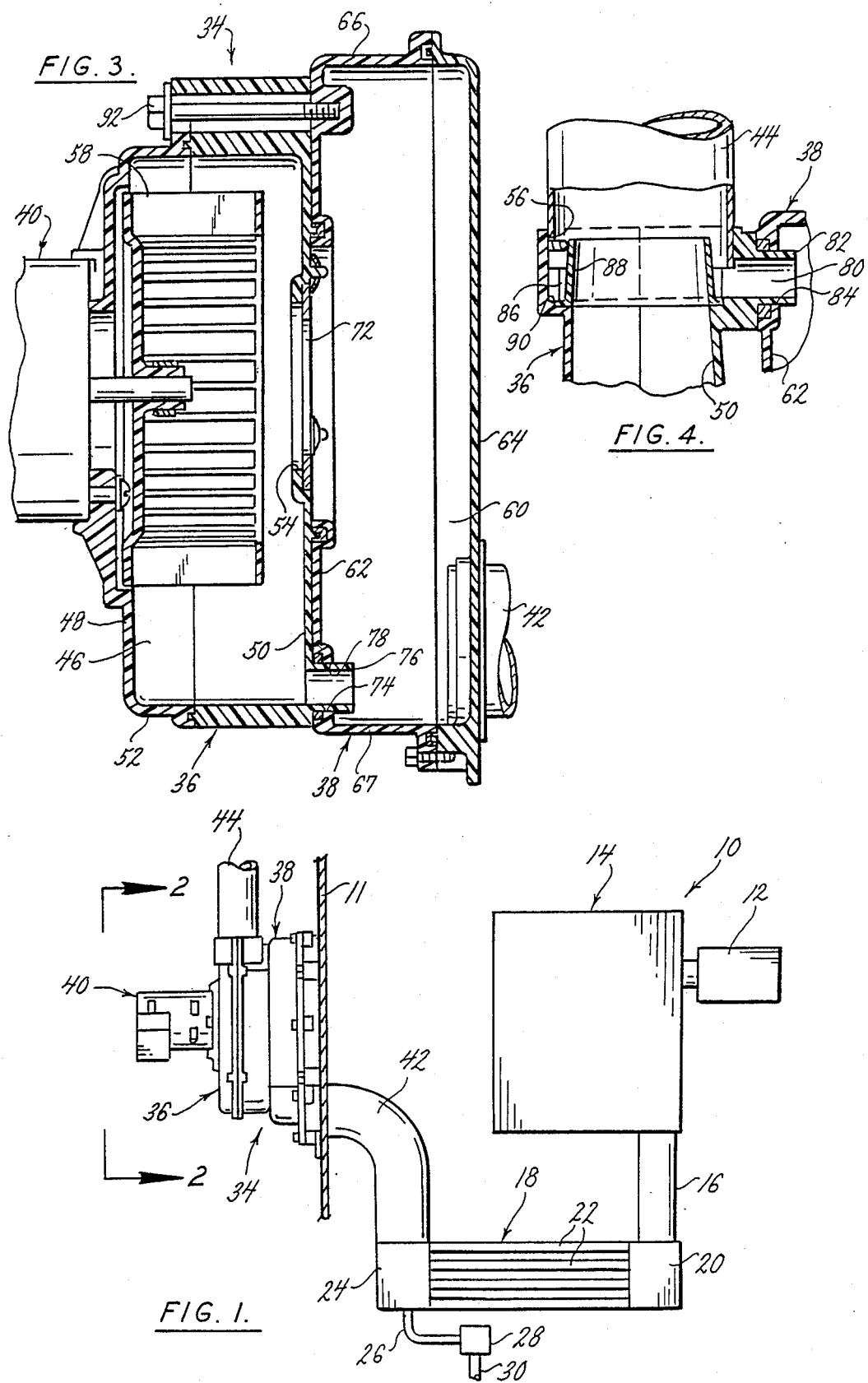
FIG. 1 is a schematic diagram of a portion of a furnace illustrating primary and secondary heat exchangers and a burner and illustrating the installation of the collector and blower assembly on a wall of the furnace.

In FIG. 1, the furnace system 10 diagrammatically illustrates a portion of a furnace having a housing including a housing wall 11. The furnace system 10 has a burner 12 connected to a primary heat exchanger 14 through which combustion products flow with passage means 16 for conveying the combustion products from the primary heat exchanger 14 to a secondary heat exchanger 18. The secondary heat exchanger 18 may have an inlet manifold 20 that receives the combustion products from the passage 16, a plurality of finned tubes 22, and an outlet manifold 24 with the tubes 22 connected between the inlet and outlet manifolds The secondary heat exchanger 18 is incorporated in what is known as a high efficiency furnace and it functions as a condenser, condensing water from the combustion products flowing through the tubes 22 so that both gaseous and liquid products enter the outlet manifold 24. Some of this condensate remains entrained in the combustion product and gas and some of the condensate falls as a liquid to the bottom of the outlet manifold 24. A condensate drain tube 26 is connected from the bottom of the outlet manifold 24 and leads to a sump 28 that in turn is connected by a tube 30 to a suitable drain, such as a floor drain.

A blower and collector assembly 34 is supported by the furnace housing wall 11 at a location above the condenser outlet manifold 24. The blower and collector assembly 34 includes a blower housing 36 and a collector housing 38. A blower 40 is supported by the blower housing 36. A pipe 42 is connected between the condenser outlet manifold 24 and the collector housing 38 and an exhaust flue pipe 44 is connected to and leads from the blower housing 36.

The blower housing 36 includes an enclosure 46 defined by end walls 48 and 50 and a curved side wall 52. There is an inlet opening 54 through the center of the end wall 50, and there is an outlet opening 56 communicating with the top of the enclosure 46 to which the exhaust flue pipe 44 is connected. A blower fan 58, such as a squirrel cage fan, is part of the blower 40 and is rotatable to draw combustion products through the inlet opening 54 and to discharge the combustion products through the outlet opening 56 to the exhaust flue pipe 44.

The collector housing 38 houses a collector enclosure 60 that is defined by end walls 62 and 64 and by top, bottom and side walls 66, 67, 68 and 69. The end wall 64 has an inlet opening 70 through it. The pipe 42 is mounted to communicate with the inlet opening 70, as illustrated in FIG. 6, and the inlet opening 70 is located so that it and the pipe 42 are as low as possible so that any liquid collected on the bottom wall 68 will flow into the pipe 42. The other end wall 62 has an outlet opening 72 that communicates with the opening 54.

There is a lower drain port 74 defined by a short tube 76 extending from the blower housing wall 50 through an opening 78 in the collector housing wall 62 (see FIG. 3). The drain port 74 is at the elevation of the lowermost extent of the side wall 52 and opens into the collector housing enclosure 60 at a level that is above the bottom wall 67. There is also an upper condensate port 80 defined by a short tube 82 extending from the blower housing wall 50 through an opening 84 in the collection chamber wall 62. The upper condensate port 80 is located just below the bottom of the exhaust flue pipe 44, which in turn is positioned by stops 86 formed in the blower housing 36.

An annular wall 88 extends upwardly in a position spaced radially inwardly from the blower housing that surrounds the outlet opening 56 to define a condensate collection trough 90. The collection trough 90 is positioned directly below the cylindrical side wall of the flue pipe 44 and communicates with the upper condensate drain port 80. Since most of the condensate that collects in the flue pipe 44 adheres to the wall of the pipe 44 and drains downwardly, most of this condensate will be intercepted by the annular condensate trough 90.

The blower housing 36 is connected to the collector housing 38 by suitable bolts 92 and an appropriate plastic adhesive is used so that all communication passages are fluid-tight.

OPERATION AND USE

In the furnace system 10, the burner 12 burns fuel and air to produce products of combustion that are drawn by the blower 40 through the primary heat exchanger 14 and then through the secondary heat exchanger 18. Air to be heated is forced past the heat exchangers by a blower (not shown). As is known, the secondary heat exchanger 18 functions as a condenser and the products of combustion entering the outlet manifold 24 include both gaseous and liquid-state products.

Some of the liquid condensate remains entrained in the gas while some falls to the bottom of the outlet manifold 24. The gaseous product carrying entrained condensate continues to be drawn by the blower 40, flowing upwardly through the pipe 42 and entering the collection chamber 60. In the pipe 42, additional condensation falls downwardly into the outlet manifold 24, while other condensation remains entrained in the gas as it enters the collection chamber 60.

The combustion products flow from the collection chamber 60 into the blower compartment 46 and are discharged through the exhaust flue pipe 44. During this entire passage of combustion products, additional condensate collects on various surfaces and flows downwardly. Because of this invention, all of the condensate flow ultimately reaches the outlet manifold 24 and can be discharged by way of the single tube 26.

The condensate flowing down the wall of the exhaust flue pipe 44 is intercepted by the annular trough 90 and flows through the upper condensate port 80 into the collection chamber 60. Any condensate from the exhaust flue pipe 44 that misses the trough 90, as well as condensate from within the blower housing 60, falls to the bottom of the compartment 46 and flows through the lower condensate port 50 into the collection chamber 60.

All condensate in the collection chamber 60 eventually falls to the bottom wall 67 and flows into the pipe 42. Since the blower and collector assembly 34 is mounted above the outlet manifold 24, the pipe 42 extends downwardly and the condensate entering it will flow downwardly into the outlet manifold 24. Thus, all the condensate collected in the entire system will flow through the single tube 26 to a sump 28 and from there by a tube to a suitable drain.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. A condensate drain system for a furnace of the kind having a condenser with an outlet section comprising:
   a blower housing having a compartment with a blower fan therein,
   means for mounting the blower housing above the condenser,
   an outlet port communicating with an upper portion of the compartment and a flue pipe connected to the outlet port,
   passage means between the condenser outlet section and the blower housing for conveying to the blower compartment combustion products and condensate conveyed to the outlet section from the condenser, said passage means communicating with the blower compartment at a lowermost area thereof whereby condensate flowing from the flue pipe and blower compartment to the bottom of the blower compartment can enter the passage means and flow by gravity to and collect in the condenser outlet section, and a drain tube connected from the condenser outlet section for conveying condensate therefrom.

2. The condensate drain system of claim 1 wherein:

the passage means includes a collector housing surrounding a collector chamber, the passage means also includes a port between the blower compartment and the collector chamber, the passage means includes a conduit opening to a lowermost area of the collector chamber.

3. The condensate drain system of claim 2 including: a fluid conduit between the blower compartment and the collector chamber, and means for diverting condensate flowing from the flue pipe toward the fluid conduit.

4. The condensate drain system of claim 3, wherein the diverting means comprises a channel in the path of condensate dripping from the inside wall of the flue pipe, the fluid conduit communicating with and being at least as low as the channel.

5. The condensate drain system of claim 1 including means within the blower compartment for intercepting condensate dripping from the flue pipe and for diverting such condensate away from the blower fan.

6. The condensate drain system of claim 5 wherein the intercepting and diverting means comprises a channel in the path of condensate dripping from the flue pipe.

7. A condensate drain system for a furnace of a kind having a heat exchanger that produces condensation of water and having means for conveying condensate from an outlet of the heat exchanger to a drain, the condensate drain system comprising:

a collector housing located above the heat exchanger, a blower housing and a blower supported thereby, suction passage means between the collector housing and the blower housing for the passage of combustion products drawn by the blower into the blower housing from the collector housing, means for connecting the heat exchanger outlet to the collector housing for the transfer of combustion products from the heat exchanger to the collector housing, an exhaust flue connected to an upper portion of the blower housing, and passage means between a lowermost portion of the blower housing and the collector housing for conveying condensate from the blower housing to the collector housing.

8. The condensate drain system of claim 7 wherein the heat exchanger includes a condenser having an outlet and an outlet manifold connected to the outlet, a condensate port adjacent the bottom of the outlet manifold communicating with the conduit conveying means, the connecting means being connected to the outlet manifold above the condensate port.

9. The condenser drain system of claim 7 including a second passage means for connecting an upper portion of the blower housing to the collector housing, and a baffle in the blower housing for intercepting condensate from the exhaust flue and directing the condensate to the second passage means.

10. A condensate drain system for a furnace of the kind having a heat exchanger comprising:

blower housing having a compartment with a blower fan therein, a collector housing surrounding a collector chamber, the collector chamber having an inlet for receiving combustion products from the heat exchanger, the collector chamber having an outlet for discharging combustion products, the blower compartment having an inlet communicating with the collector chamber outlet, the blower compartment having an outlet from an upper area thereof for discharging combustion products to a flue pipe, an upper condensate port between the blower compartment and the collector chamber, means for intercepting condensate dripping through the blower outlet and for diverting the condensate to the upper condensate port, a lower condensate port between the blower compartment and the collector chamber, the lower condensate port being substantially as low as the lowest area of the blower compartment.

11. The condensate drain system of claim 10 wherein the collector chamber inlet is located to enable condensate to flow by gravity from the bottom of the collector chamber through the collector chamber inlet.

12. A system for collecting and draining condensate from a heating apparatus comprising;

a blower means;

a condenser means; and a passage means between the condenser means and the blower means, the passage means being adapted to convey combustion products and condensate from the condenser means to the blower means, and also being adapted to collect, substantially all of the condensate conveyed and drain the condensate from the heating system.

13. The system of claim 12 comprising:

the heating apparatus being a furnace.

14. The system of claim 12 comprising:

the passage means including a condenser outlet section adapted to receive combustion products and condensate from the condenser means, and a fluid passage adapted to convey the combustion products and condensate from the outlet section to the blower means.

15. The system of claim 14 comprising:

the outlet section being adapted to collect condensate that forms in the blower means, the fluid passage, the outlet section, and the condenser.

16. The system of claim 12 comprising:

the passage means being adapted to collect condensate that forms in the blower means, the passage means, and the condenser means, and to conduct a flow of the condensate formed to a bottom area of the passage means.

17. The system of claim 16 comprising:

the passage means including a condenser outlet section adapted to receive combustion products and condensate from the condenser means; and a fluid passage adapted to convey the combustion products and condensate from the outlet section to the blower means, and being adapted to conduct a flow of condensate from the blower means and the fluid passage to the outlet section.

18. The system of claim 17 comprising:

the outlet section being adapted to collect condensate that flows from the fluid passage and to drain the fluid out of the heating apparatus.

19. A condensate drain system for a furnace having a condenser, the system comprising:
   a blower means adapted to eject combustion products from the furnace;
   a passage means extending between the condenser and the blower means, the passage means being adapted to conduct combustion products and condensate from the condenser to the blower means, and being adapted to collect substantially all of the condensate from the blower means, the passage means, and the condenser and to drain condensate collected from the furnace.

* * * * *